(12) United States Patent
Douchi et al.

(10) Patent No.: US 8,095,820 B2
(45) Date of Patent: Jan. 10, 2012

(54) STORAGE SYSTEM AND CONTROL METHODS FOR THE SAME

(75) Inventors: Yusuke Douchi, Odawara (JP); Hiroshi Izuta, Odawara (JP)

(73) Assignee: Hitachi, Ltd., Tokyo (JP)

( * ) Notice: Subject to any disclaimer, the term of this patent is extended or adjusted under 35 U.S.C. 154(b) by 358 days.

(21) Appl. No.: 12/526,615

(22) PCT Filed: Jun. 2, 2009

(86) PCT No.: PCT/JP2009/002471
§ 371 (c)(1),
(2), (4) Date: Aug. 10, 2009

(87) PCT Pub. No.: WO2010/140189
PCT Pub. Date: Dec. 9, 2010

(65) Prior Publication Data
US 2011/0185226 A1   Jul. 28, 2011

(51) Int. Cl.
*G06F 11/00* (2006.01)
(52) U.S. Cl. .................. 714/6.13; 709/224; 709/230
(58) Field of Classification Search ............... 714/6.13; 709/223, 230
See application file for complete search history.

(56) References Cited

U.S. PATENT DOCUMENTS

| | | | |
|---|---|---|---|
| 6,397,347 B1 | 5/2002 | Masuyama et al. | |
| 6,754,853 B1 | 6/2004 | DeKoning et al. | |
| 7,027,406 B1 * | 4/2006 | Shabtay et al. | 370/252 |
| 7,275,179 B1 | 9/2007 | Coatney | |
| 7,594,134 B1 * | 9/2009 | Coatney et al. | 714/3 |
| 2004/0017770 A1 * | 1/2004 | Higashiyama et al. | 370/223 |
| 2006/0047908 A1 | 3/2006 | Chikusa | |
| 2006/0176889 A1 * | 8/2006 | Berman | 370/405 |
| 2007/0300228 A1 * | 12/2007 | White et al. | 718/102 |
| 2008/0101419 A1 * | 5/2008 | Suriyanarayanan | 370/503 |
| 2008/0146347 A1 * | 6/2008 | Okada | 463/42 |
| 2008/0189499 A1 * | 8/2008 | Ogata et al. | 711/162 |
| 2008/0244098 A1 | 10/2008 | Oikawa | |
| 2009/0022052 A1 * | 1/2009 | Yoshimaru | 370/223 |
| 2009/0037638 A1 * | 2/2009 | Izuta et al. | 710/316 |
| 2009/0077413 A1 * | 3/2009 | Dake et al. | 714/4 |
| 2010/0091646 A1 * | 4/2010 | Pao | 370/225 |
| 2011/0176550 A1 * | 7/2011 | Wang et al. | 370/392 |

FOREIGN PATENT DOCUMENTS

JP   2008-242872   10/2008

* cited by examiner

*Primary Examiner* — Scott Baderman
*Assistant Examiner* — Loan L. T. Truong
(74) *Attorney, Agent, or Firm* — Brundidge & Stanger, P.C.

(57) ABSTRACT

A RAID group is configured and operated by using multiple storage drives 171 and expanders 112 and 121 connected with the storage drives 171. If a failure related to any storage drive 171 is detected, a storage system 10 which issues a broadcast and a discover command to the communication path of the storage drive 171 manages a broadcast inhibiting flag for setting the information showing whether to inhibit transmission of broadcast per storage drive 171. If a failure occurs to a storage drive 171 constituting a RAID group whose redundancy is lost, the storage system 10 sets the broadcast inhibiting flag to inhibiting the broadcast transmission, and if a failure related to the storage drive 171 occurs and the broadcast inhibiting flag of the storage drive 171 is being set to inhibiting the transmission, inhibits the transmission of the broadcast.

12 Claims, 11 Drawing Sheets

[Fig. 1A]
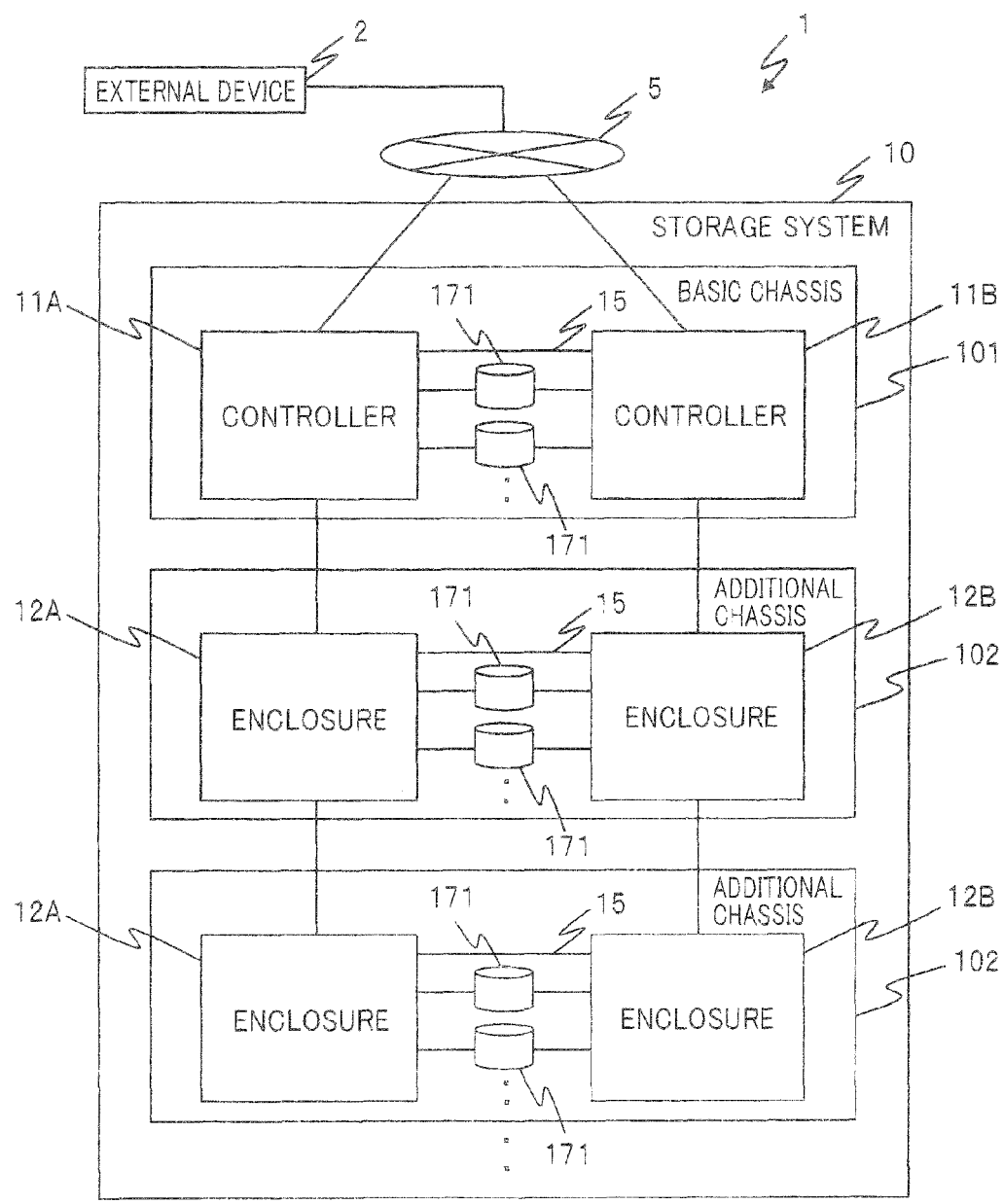

[Fig. 1B]
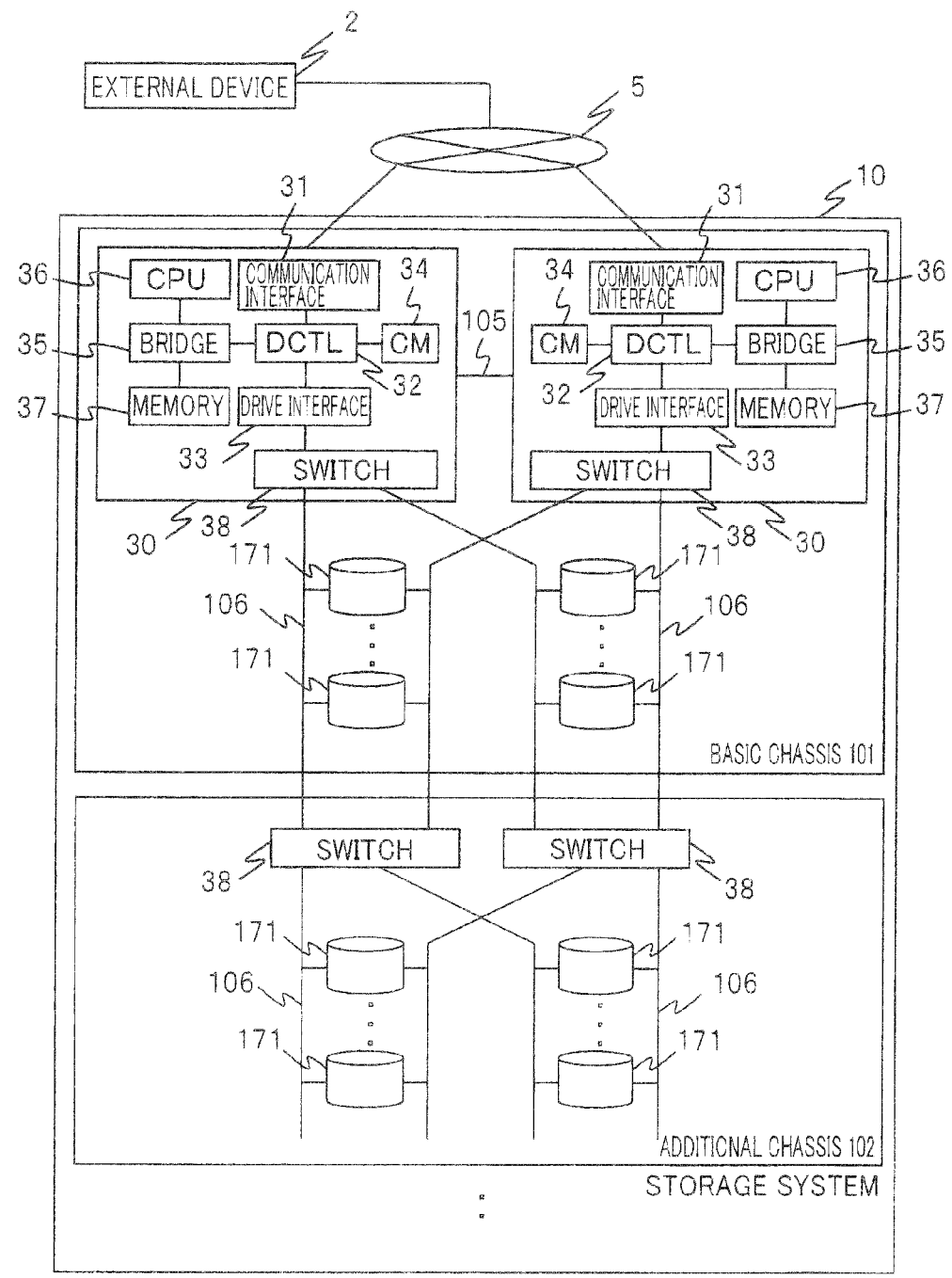

[Fig. 2]
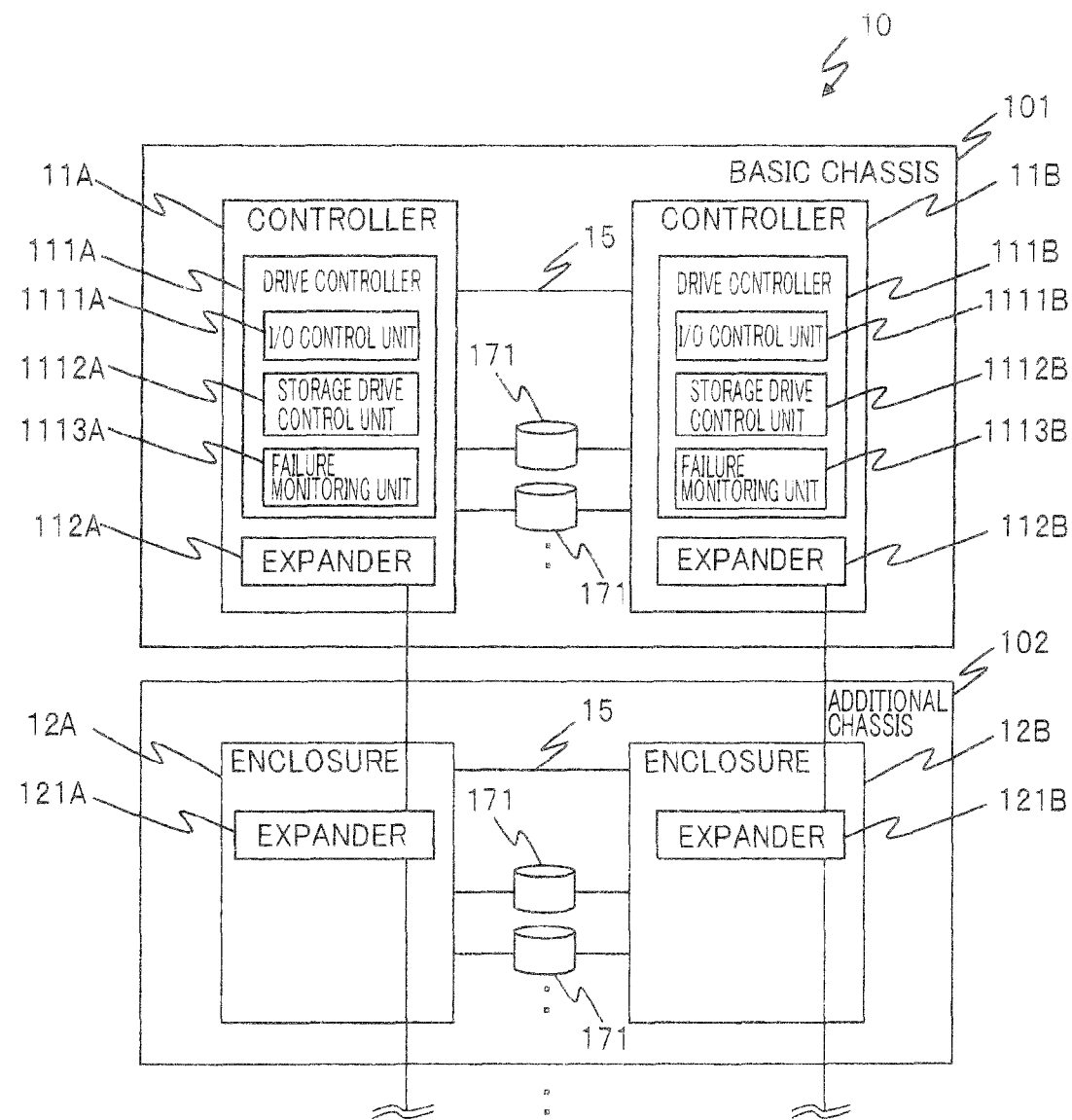

[Fig. 3]
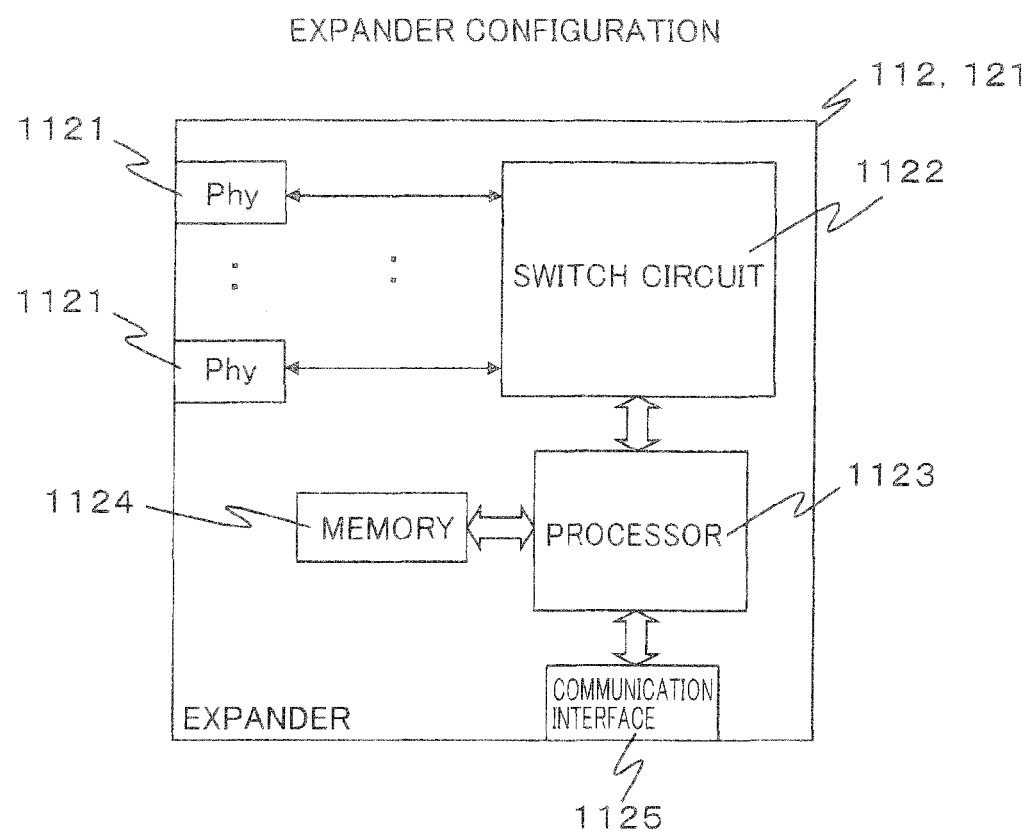

[Fig. 4A]
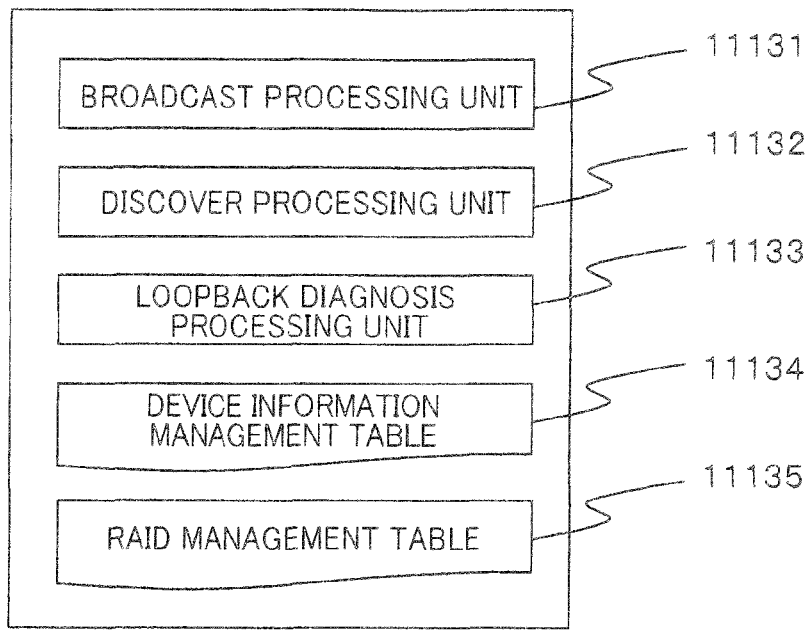
[Fig. 4B]
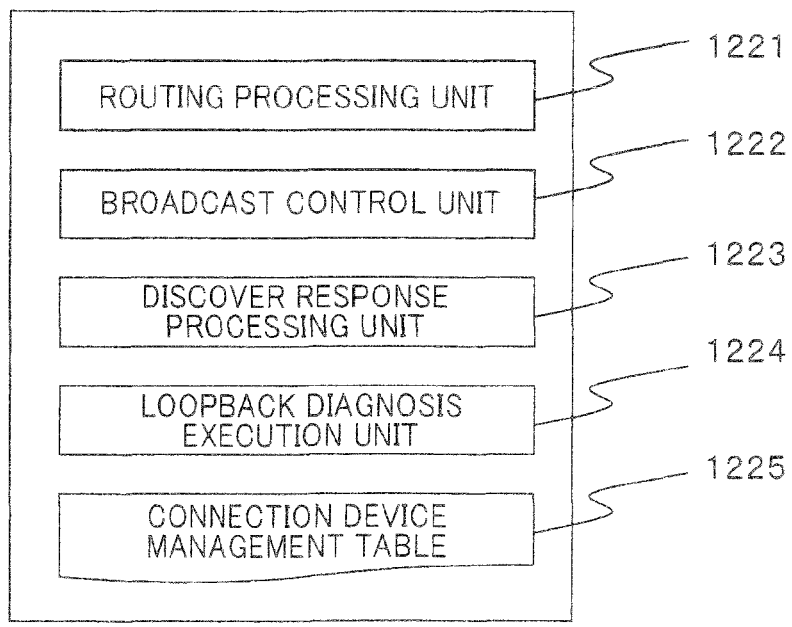

[Fig. 5A]

DEVICE INFORMATION MANAGEMENT TABLE 11134

| DEVICE ID | FAILURE INFORMATION | Phy STATUS | BROADCAST INHIBITING FLAG |
|---|---|---|---|
| Expander 0 | NO FAILURE | AVAILABLE | 0 |
| Expander 1 | NO FAILURE | AVAILABLE | 0 |
| Expander 2 | NO FAILURE | AVAILABLE | 0 |
| ... | ... | ... | ... |
| HDD 0 | NO FAILURE | AVAILABLE | 0 |
| HDD 1 | NO FAILURE | AVAILABLE | 0 |
| HDD 2 | NO FAILURE | AVAILABLE | 0 |
| HDD 3 | NO FAILURE | AVAILABLE | 0 |
| HDD 4 | FAILURE | AVAILABLE | 1 |
| ... | ... | ... | ... |

RAID MANAGEMENT TABLE 11135

| RAID GROUP ID | RAID METHOD | CONFIGURATION DEVICE ID | REDUNDANCY |
|---|---|---|---|
| 00 | RAID5 | HDD0 | NON-REDUNDANT |
|  |  | HDD1 |  |
|  |  | HDD2 |  |
|  |  | HDD3 |  |
|  |  | HDD4 |  |
| 01 | RAID5 | HDD5 | REDUNDANT |
|  |  | HDD6 |  |
|  |  | HDD7 |  |
|  |  | HDD8 |  |
|  |  | HDD9 |  |
| ... | ... | ... | ... |

111351, 111352, 111353, 111354

[Fig. 5C]
CONNECTION DEVICE MANAGEMENT TABLE 1225
| PhyID | CONNECTION DEVICE ID | PhySTATUS | BROADCAST INHIBITING FLAG | LOOPBACK TEST RESULT |
|---|---|---|---|---|
| 00 | HDD0 | AVAILABLE | 0 | NORMAL |
| 01 | HDD1 | AVAILABLE | 0 | NORMAL |
| 02 | HDD2 | AVAILABLE | 0 | NORMAL |
| 03 | HDD3 | AVAILABLE | 0 | NORMAL |
| 04 | HDD4 | AVAILABLE | 1 | ABNORMAL |
| . | . | . | . | . |
| . | . | . | . | . |
| . | . | . | . | . |
11251, 11252, 11253, 11254, 11255
[Fig. 6]
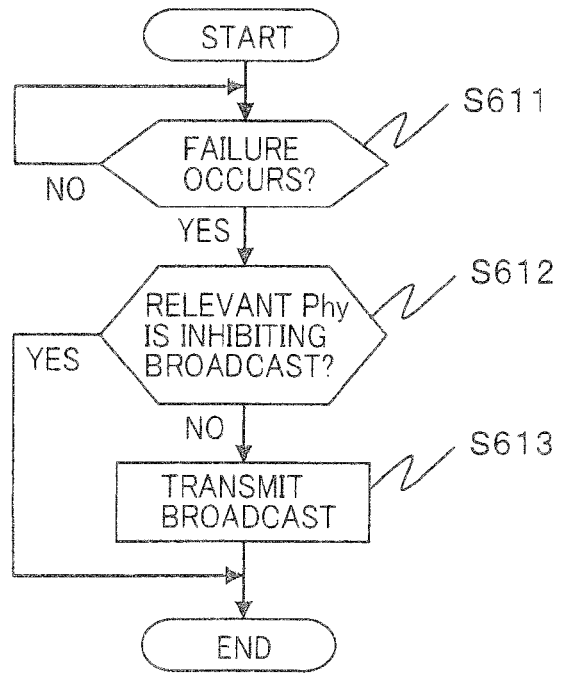
PROCESSING IN EXPANDER

[Fig. 7A]
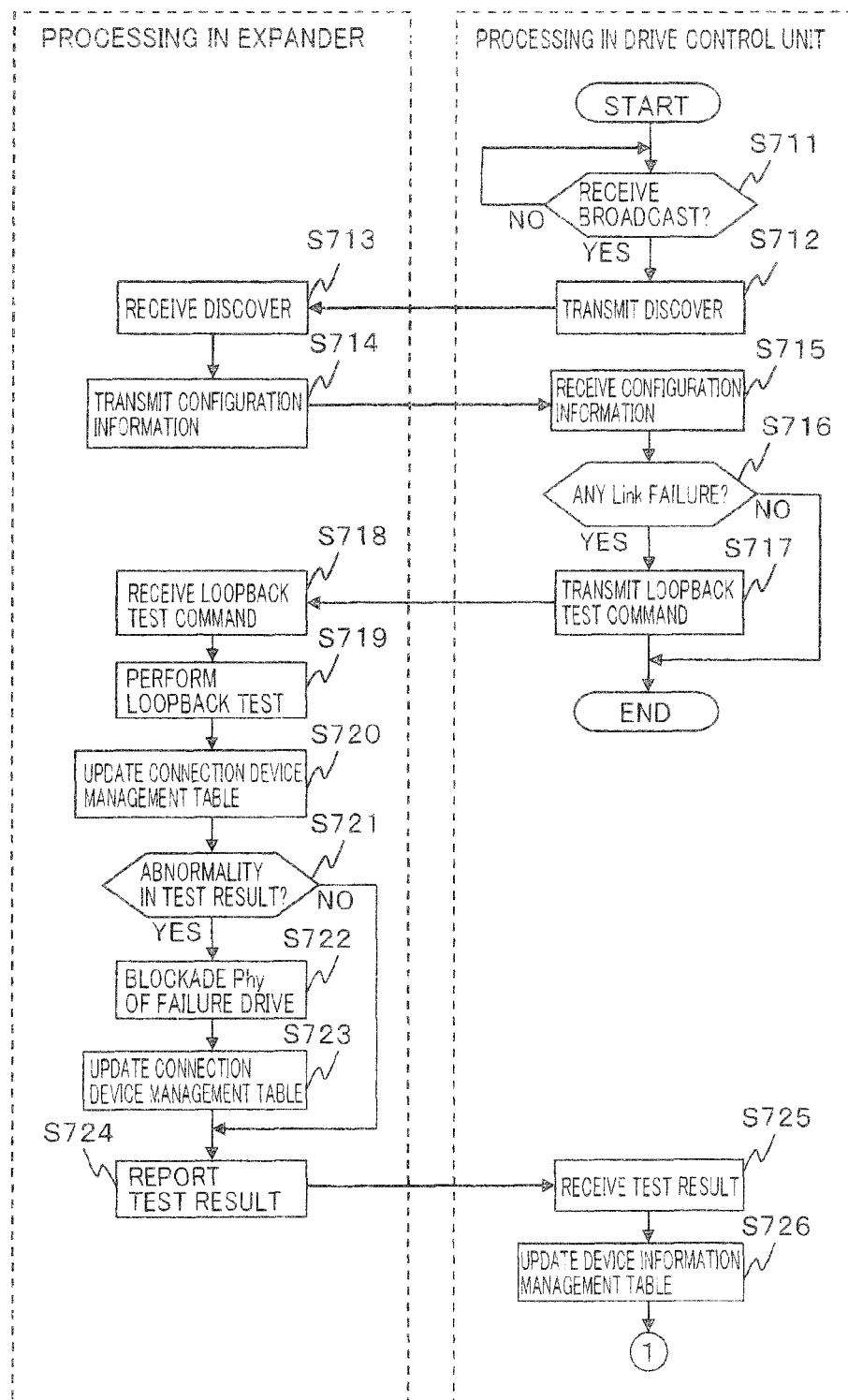

[Fig. 7B]
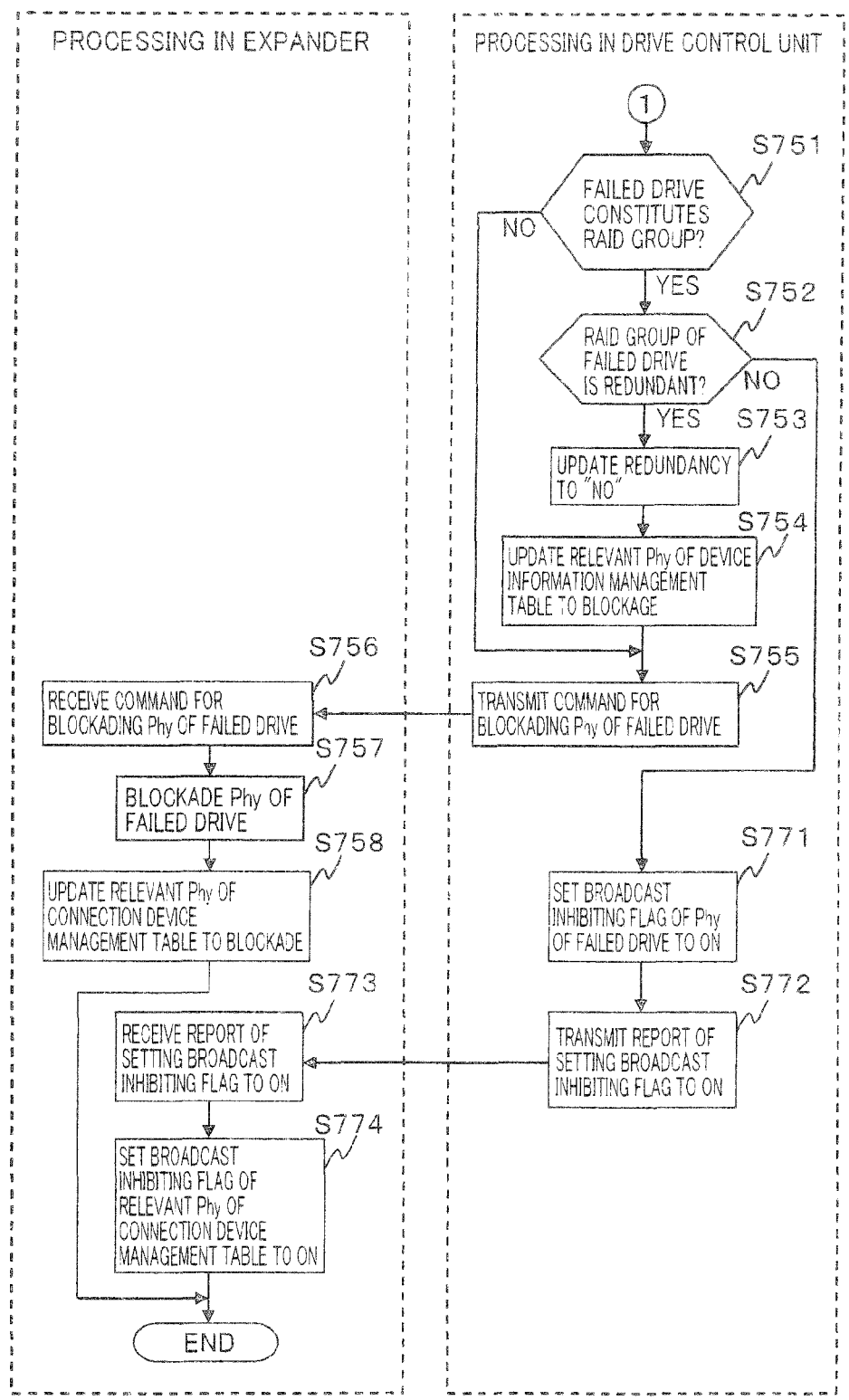

[Fig. 8]
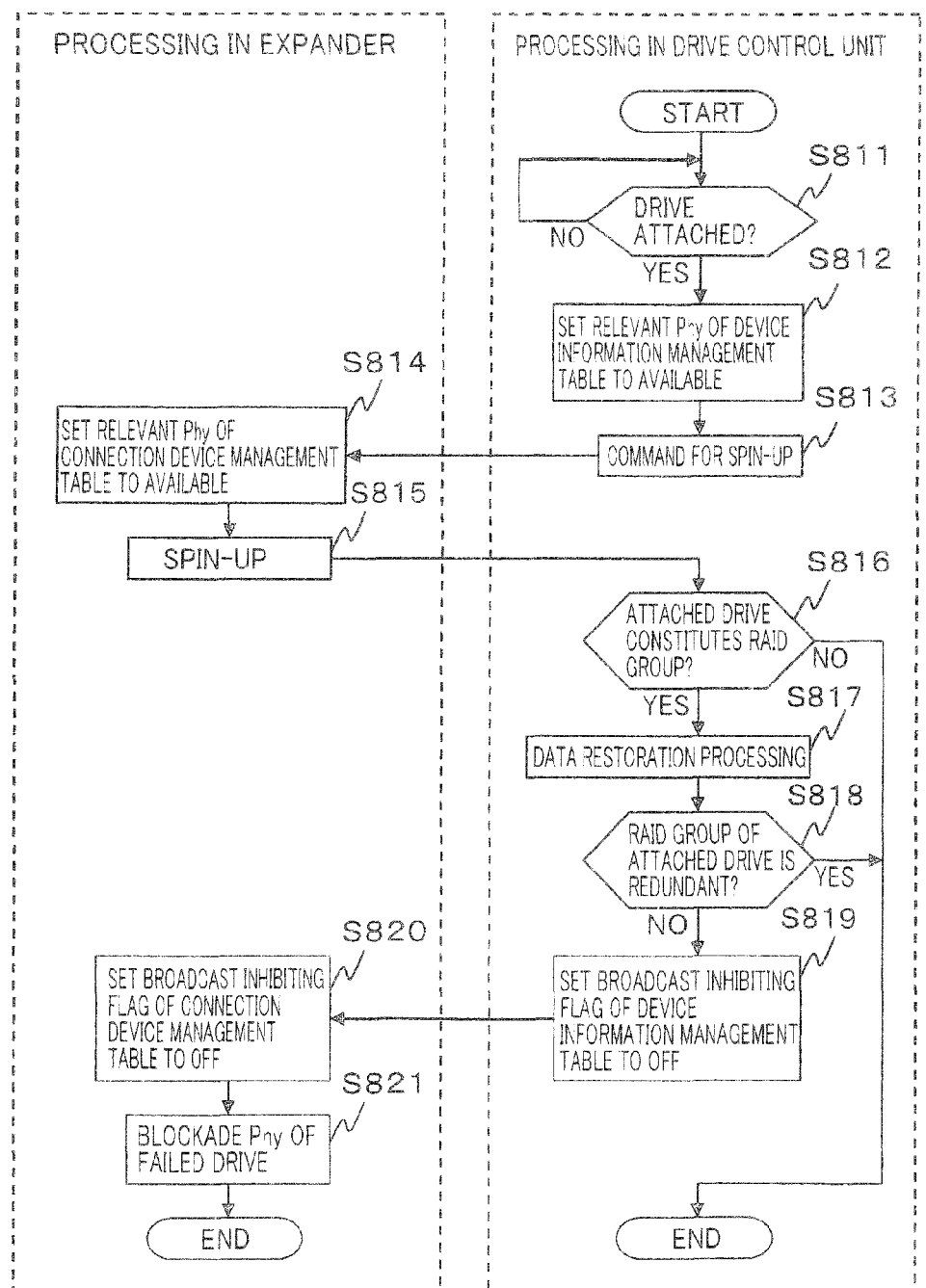

[Fig. 9]
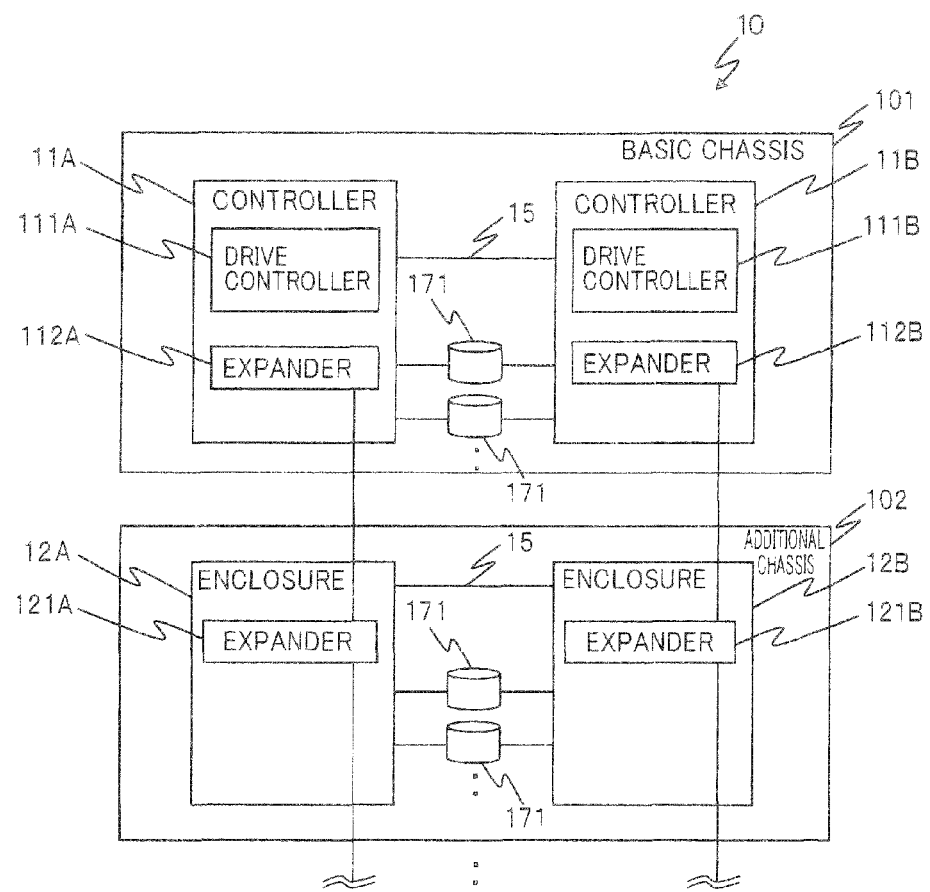

STORAGE SYSTEM AND CONTROL METHODS FOR THE SAME

TECHNICAL FIELD

This invention relates to a storage system and control methods for the same, especially the technologies of appropriately controlling storage system operations when a failure occurs in a storage drive.

BACKGROUND ART

FIG. 9 shows an example of a storage system 10. As shown in the figure, this storage system 10 includes a basic chassis 101 and one or more additional chassis 102 connected by cascading connections with the basic chassis 101. In the basic chassis 101, redundantly configured controllers 11A, 11B, and one or more storage drives 171 are installed. Meanwhile, in the additional chassis 102, redundantly configured enclosures 12A, 12B, and one or more storage drives 171 are installed.

As shown in the above-mentioned figure, each of the controllers (the reference to "A" or "B" for discriminating between the redundantly configured devices are hereinafter omitted unless otherwise required) includes a drive controller 111 and an expander 112. Meanwhile, the enclosure 12 includes an expander 121. The expanders 112 and 121 function as relay devices (data transfer switches) which enable communication (interconnection) between the drive controller 111 and the storage drive 171.

The drive controller 111 receives data input/output requests (data write requests, data read requests, etc.) transmitted from an external device 2 and transmits access requests for the storage drives 171 to the expanders 112 and 121. Furthermore, the drive controller 111 transmits a response to processing for the received data I/O requests (read data, read completion reports, write completion reports, etc.) to the external device 2.

As a storage system including such a configuration, for example, PLT 1 discloses a system including multiple SAS expanders (SAS: Serial Attached SCSI) connected by the cascading connection. The document also refers, as backend processing, to the broadcast frame issued by the SAS expanders when a failure occurs and the discover command issued by the controllers in order to obtain system configuration information.

CITATION LIST

Patent Literature

PTL 1: Japanese Patent Application Laid-Open Publication No. 2008-242872

SUMMARY OF INVENTION

Technical Problem

In the storage system in the above-mentioned configuration, if a failure occurs in a storage drive 171 or in an access path to the storage drive 171, the storage drive 171 is blockaded as needed. The reason for blockading the storage drive 171 is that, if the storage drive 171 in which the failure has occurred continues to be used, the broadcast frame and the discover command are issued repeatedly and congestion occurs in the access path to the storage drive 171, which might deteriorate the service for the external device 2.

It is well known that, during storage system operations, a kind of failure called an intermittent failure whose failure status does not last long and which is poorly reproducible may occur. However, when an intermittent failure occurs in the storage system, the blockage of the storage drive 171 as mentioned above is not always appropriate. For example, if a storage drive operating a RAID group whose redundancy is already lost by the blockade of another storage drive 171 is further blockaded, the function of the RAID group stops and affects the service for the external device, while an intermittent failure might be solved immediately, and therefore, in some cases, it is preferable not to blockade the storage drive 171, considering the storage system operations.

In view of the above-mentioned situation, this invention is intended for the purpose of providing a storage system capable of appropriately controlling storage system operations when a failure occurs in a storage drive and control methods for the same.

Solution to Problem

An aspect of this invention for achieving the above-mentioned objects is a storage system including
a plurality of storage drives,
a switch device connecting the storage drives,
an I/O processing unit which accesses the storage devices via the switch device in accordance with data input/output requests received from an external device,
a storage drive control unit which configures a group of the storage drives and operates the group by redundancy method,
a broadcast transmitter which, when detecting a failure related to the storage drives, transmits broadcast to a communication path connecting the I/O processing unit and the storage drives, and
a failure monitoring unit which, when receiving the broadcast, transmits a discover command to the switch device,
wherein the storage system
manages current redundancy of the group,
manages a broadcast inhibiting flag by which information is set per storage drive whether to inhibit broadcast transmission,
sets the broadcast inhibiting flag to inhibiting broadcast transmission when a failure occurs to the storage drive which constitutes the group being operated without redundancy, and
when a failure related to the storage drive occurs, judges whether the broadcast inhibiting flag of the relevant storage drive is set to inhibiting broadcast transmission, and if it is set to inhibiting, inhibits transmission of the broadcast.

According to the storage system of this invention, when a failure related to a storage drive is detected, if the redundancy of the group configured by using the storage drive is lost, issuing broadcast is inhibited and the discover command is not issued. Therefore, the storage drive is not blockaded, and if the failure is an intermittent failure for example, the group function can be maintained, and the service for the external device can be kept away from being affected. Thus, this invention enables an appropriate control of the storage system operations when a failure related to the storage drive occurs.

Another aspect of this invention is the above-mentioned storage system wherein, when a failure related to the storage drive occurs, a loopback diagnosis is performed on the failed storage drive, and if the failure is of a specific type, the failed storage drive is blockaded regardless of the indication of the broadcast inhibiting flag.

If the result of the loopback diagnosis shows a link failure or the like, for example (e.g. if the failure is of a specific type), the storage system blockades the failed storage drive regardless of the indication of the broadcast inhibiting flag. Therefore, the failed storage drive is blockaded as needed, leading to the safe operation of the storage system. As mentioned above, this invention enables the appropriate control of the storage system operations when a failure related to the storage device occurs.

Another aspect of this invention is the above-mentioned storage system wherein, when a failure related to the storage drive occurs, if the group constituted by using the relevant storage drive is redundant, the failed storage drive is blockaded.

As mentioned above, if a failure related to the storage drive occurs and if the group configured by using the storage drive is redundant, the storage system blockades the storage drive. Therefore, if the group is redundant, the failed storage drive is certainly blockaded, which leads to the safe operation of the storage system. Thus, this invention enables the appropriate control of the storage system operations when a failure related to the storage drive occurs.

Another aspect of this invention is the above-mentioned storage system wherein the broadcast inhibiting flag of the storage drive constituting the group is set to not inhibiting broadcast transmission when the failure of the storage drive is solved and the redundancy of the group is restored.

As mentioned above, if the redundancy of the group is restored, the storage system sets the content of broadcast inhibiting flag of the storage drive to not inhibiting broadcast transmission. Therefore, if another failure occurs to the storage drive of the group with redundancy again, broadcast and the discover command are issued. Thus, the storage system does not inhibit broadcast transmission unnecessarily, and the safe operation of the storage system is enabled when the group has redundancy. In summary, this invention enables the appropriate control of the storage system operations when a failure related to the storage drive occurs.

Note that the storage system blockades the storage drive, for example, by blockading a communication port which is connected with the failed storage drive among the communication ports included in the switch device. The switch device is, for example, an expander. Furthermore, the storage drives may be hard disk drives or semiconductor storage devices (SSDs), and the group may be a RAID group configured where the storage drives are operated by a RAID method with redundancy (e.g. RAID5, 6)

The other problems and solutions for the same according to this invention are described by the embodiments and the attached figures.

ADVANTAGEOUS EFFECTS OF INVENTION

This invention enables appropriate control of storage system operations when a failure related to storage drives of the storage system occurs.

BRIEF DESCRIPTION OF DRAWINGS

FIG. 1A is a diagram showing the configuration (chassis configuration) of the storage system 10.
FIG. 1B is a diagram showing an example of the hardware configuration of the storage system 10.
FIG. 2 is a diagram showing the configuration of the basic chassis 101 and the additional chassis 102.
FIG. 3 is a diagram showing an example of the hardware configuration of the expander 112 and the expander 121.
FIG. 4A is a diagram showing the functions and the data included in the failure monitoring unit 1113.
FIG. 4B is a diagram showing the functions and the data included in the expander 112 and the expander 121.
FIG. 5A is a diagram showing an example of the device information management table 11134.
FIG. 5B is a diagram showing an example of the RAID management table 11135.
FIG. 5C is a diagram showing an example of the connection device management table 1225.
FIG. 6 is a flowchart showing the processing performed by the expander 112 and the expander 121 when a failure occurs.
FIG. 7A is a flowchart showing the processing performed by the drive controller 111, the expander 112 and the expander 121 when the drive controller 111 receives the broadcast frame.
FIG. 7B is a flowchart showing the processing performed by the drive controller 111, the expander 112 and the expander 121 when the drive controller 111 receives the broadcast frame.
FIG. 8 is a flowchart showing the processing performed by the drive controller 111, the expander 112 and the expander 121 for recovering from the failure.
FIG. 9 is a diagram showing an example of the storage system 10.

DESCRIPTION OF EMBODIMENTS

An embodiment is described below. FIG. 1A shows the configuration (chassis configuration) of the storage system 10 to be described as the embodiment. As shown in the figure, the storage system 10 is connected communicable with one or more external devices 2 (host devices) which utilize the relevant storage system 10.

The communication network 5 is, for example, LAN, SAN (Storage Area Network), the Internet, the public communication network and others. The communication between the external device 2 and the storage system 10 is performed by using, for example, TCP/IP, iSCSI (internet Small Computer System Interface), Fibre Channel Protocol, FICON (Fibre Connection, trademark), ESCON (Enterprise System Connection, trademark), ACONARC (Advanced Connection Architecture, trademark), FIBARC (Fibre Connection Architecture, trademark) and others.

The external device 2 is, for example, a personal computer, a mainframe, an office computer and others, i.e. an information processing device (a computer) utilizing the storage area provided by the storage system 10 as the data storage area. The external device 2, when accessing the above-mentioned storage area, transmits a data input/output request (hereinafter referred to as a data I/O request) to the storage system 10.

As shown in the figure, the storage system 10 described by this embodiment includes a basic chassis 101 and one or more additional chassis 102 serially connected by a cascading connection with the relevant basic chassis 101. The basic chassis 101 includes redundantly configured controllers 11A and 11B and one or more storage drives 171 communicatively connected with these controllers 11A and 11B via a connection line 15 such as a bus.

The controllers 11A, 11B, and the storage drives 171 are unitized, and these are attached to or detached from the basic chassis 101 along slots installed in the basic chassis 101. Note that, though not specifically shown in the figure, the basic chassis 101 may include various auxiliary devices such as a cooling system (e.g. a cooling fan) for cooling heat-generating elements such as storage drives 171 installed in the basic chassis 101, a power supply device for driving the controllers 11A, 11B, the storage drives 171, the cooling system and others.

The additional chassis 102 includes redundantly configured enclosures 12A and 12B and one or more storage drives 171 communicatively connected with these enclosures 12A and 12B. The enclosures 12A and 12B are communicatively connected with each other via a connection line 15 such as a bus. The enclosures 12A and 12B are unitized, and they can be easily attached to or detached from the additional chassis 102 along the slots installed in the additional chassis 102. Note that, though not specifically shown in the figure, the additional chassis 102 may include various auxiliary devices such as a cooling system (e.g. a cooling fan) for cooling heat-generating elements such as storage drives 171 installed in the additional chassis 102, a power supply device for driving the storage drives 171, the cooling system and others.

The storage drives 171 connected to the basic chassis 101 and the additional chassis 102 are hard disk drives or semiconductor storage devices (SSD (Solid State Drive)) and the like that comply with the standards of, for example, SAS (Serial Attached SCSI), SATA (Serial ATA), FC (Fibre Channel), PATA (Parallel ATA), SCSI (Small Computer System Interface) and others.

FIG. 1B shows an example of the storage system 10 in the above-mentioned configuration. As shown in the figure, this storage system 10 includes the basic chassis 101 in which multiple redundantly configured control boards 30 are installed and the additional chassis 102 without any control board 30.

A control board 30 includes a communication interface 31, a data controller 32 (DCTL), a drive I/F 33 (storage media control unit), a cache memory 34 (CM), a bridge 35, a CPU 36, a memory 37 and a switch 38.

The storage drives 171 installed in the basic chassis 101 and in the additional chassis 102 respectively are, for example, connected to the control board 30 via a Fibre channel loop 106. The control boards 30 are communicatively connected via the internal communication line 105.

FIG. 2 shows the more specific configuration of the controllers 11 installed in the basic chassis 101 (the reference to "A" or "B" for discriminating between the redundantly configured devices are hereinafter omitted unless otherwise required) and the enclosures 12 installed in the additional chassis 102. As shown in the figure, the controllers 11 installed in the basic chassis 101 include the drive controllers 111 and the expanders 112 (switch devices). Furthermore, the enclosures 12 installed in the additional chassis 102 include expanders 121.

The drive controller 111 of the controller 11 includes I/O control units 1111, storage drive control units 1112, and failure monitoring units 1113. These functions included in the drive controller 111 are realized, for example, by hardware included in the control board 30, or by the CPU 36 included in the control board 30 reading and executing a program stored in the memory 37 of the control board 30.

Among the above-mentioned functions included in the drive controller 111, the I/O control unit 1111 controls data transfer protocols in communication with the external device 2. The I/O control unit 1111, when receiving a data I/O request (data write request, data read request or others) transmitted from the external device 2, transmits an access request for the storage drives 171 to the expander 112 or the expander 121. Furthermore, the I/O control unit 1111 transmits a response to processing for the received I/O request (read data, a read completion report, a write completion report, etc.) to the external device 2.

As for the processing related to data I/O requests, the I/O control unit 1111 performs staging or destaging of the data to be written to the storage drives 171 (hereinafter referred to as write data) or the data to be read from the storage drives 171 (hereinafter referred to as read data) to the cache memory 34 (CM). Furthermore, the I/O control unit 1111 transmits access requests for the storage drives 171 (hereinafter referred to as drive access requests) to the expander 112 and the expander 121, and receives the responses which the expanders 112 and 121 transmit in accordance with the drive access requests (data read from the storage drives 171, a report of completing the read from the storage drives 171, a report of completing the write to the storage drives 171, etc.).

The storage drive control unit 1112 of the drive controller 111 controls the storage drives 171 (e.g. control related to RAID when the storage drives 171 are controlled by the RAID (Redundant Arrays of Inexpensive (or Independent) Disks) method (the redundancy method) such as RAID5, 6) and manages the configuration information of the storage drives 171 (control over the connection status of the storage drives 171 and control over RAID-related information).

The failure monitoring unit 1113 of the drive controller 111 performs failure monitoring and failure management of the expanders 112 included in the controllers 11 of the basic chassis 101, the enclosures 12 included in the additional chassis 102, the storage drives 171 connected with the basic chassis 101 and the additional chassis 102, and others.

The expanders 112 included in the controllers 11 and the expanders 121 included in the enclosures of the additional chassis 102 are relay devices (data transfer switches) which enable communication (interconnection) between the drive controllers 111 of the controllers 11 and the storage drives 171.

The expanders 112 and 121 operate as initiators or targets in SMP (Serial Management Protocol), SSP (Serial SCSI protocol), or in STP (Serial ATA tunneling protocol). The expanders 112 and 121 configure the network topology, for example, in a tree structure with the drive controllers 111 of the controllers 11 on their centers.

FIG. 3 shows the hardware configuration of the expander 112 or the expander 121. As shown in the figure, each of the expanders 112 and 121 includes multiple physical ports (hereinafter referred to as Phys 1121), a switch circuit 1122, a processor 1123, a memory 1124 and a communication interface 1125.

The Phy 1121 includes a serial parallel conversion circuit such as SerDes (Serializer/DeSerializer). The switch circuit 1122 includes an ECR (Expander Connection Router) which controls the data transfer among the Phys 1121 in accordance with the settings of routing and zoning stored in the memory 1124, an ECM (Expander Connection Manager) which performs the settings of routing and zoning, and BPP (Broadcast Primitive.Processor) and others. The BPP monitors the switch circuit 1122, the devices connected with the switch circuit 1122, and the status change of the communication, such as the connection status of the storage drives 171 to be connected with the Phys 1121, the presence of physical links (Linkup/Linkdown) and the presence of communication failures. The BPP, when detecting the above-mentioned status change, transmits a broadcast frame from the Phy 1121.

FIG. 4A shows the main functions and the data included in the failure monitoring unit 1113. As shown in the figure, the failure monitoring unit 1113 includes a broadcast processing unit 11131, a discover processing unit 11132, and a loopback diagnosis processing unit 11133. The failure monitoring unit 1113 also manages (stores) a device information management table 11134 and a RAID management table 11135.

The broadcast processing unit 11131 of the failure monitoring unit 1113, when receiving a broadcast frame transmitted from the Phys 1121 of the expanders 112 and 121, reports it to the discover processing unit 11132. The broadcast processing unit 11131 performs the setting of the broadcast inhibiting flag 111344 of the device information management table 11134 (described later).

The discover processing unit 11132, when receiving the above-mentioned report from the broadcast processing unit 11131, transmits a discover command to the communication path connecting the controller 11, the expanders 112 and 121, and storage drives 171. The discover command is issued when obtaining the information showing the configuration and the status of the expanders 112 and 121, the information showing what devices are currently connected with the Phys 1121 of the expanders 112 and 121, and the information showing the status of the connected devices (such as the presence of failures) and the communication status (such as the presence of link failures) (hereinafter referred to as configuration information). "Discover" issued by the above-mentioned SMP and "SSP Discover Extended" issued by the SSP are included in the examples of the discover commands. The discover processing unit 11132 updates the device information management table 11134 and the RAID management table 11135 with reference to the configuration information which the expanders 112 and 121 return in accordance with the discover command.

The loopback diagnosis processing unit 11133 transmits a loopback diagnosis instruction command for performing a loopback test to the expanders 112 and 121. The loopback diagnosis processing unit 11133 transmits a loopback diagnosis instruction command triggered by, for example, the information showing communication failures included in the configuration information transmitted from the expanders 112 and 121 to the discover processing unit 11132.

In the device information management table 11134 managed by the failure monitoring unit 1113, the information related to the expanders 112 and 121, and the devices currently connected with the Phys 1121 of the expanders 112 and 121 (e.g. storage drives 171) is managed. The discover processing unit 11132 updates the device information management table 11134 with reference to the configuration information reported by the expanders 112 and 121 in response to the discover command.

FIG. 5A shows an example of the device information management table 11134 managed by the failure monitoring unit 1113. As shown in the figure, the device information management table 11134 consists of one or more records including a device ID 111341, a failure information 111342, a Phy status 111343, and a broadcast inhibiting flag 111344. For the device ID 111341, the identifiers of the expanders 112 and 121 or the identifiers of the devices currently connected with the Phys 1121 of the expanders 112 and 121 (e.g. storage drives 171) are set. For the failure information 111342, the information showing the presence of failures in the corresponding device is set. For the Phy status 111343, the information showing the status of the expanders 112 and 121 (Enable/Disable) is set. For the broadcast inhibiting flag 111344, the information showing whether to inhibit issuing (transmitting) the broadcast frame is set ("1" (on) for transmission being inhibited or "0" (off) for transmission not being inhibited).

FIG. 5B shows an example of the RAID management table 11135 managed by the failure monitoring unit 1113. The RAID management table 11135 manages the information related to the RAID of the storage drives 171 included in the basic chassis 101 or the additional chassis 102. As shown in the figure, the RAID management table 11135 contains one or more records including a RAID group ID 111351 (Group), a RAID method 111352, a configuration device ID 111353, and redundancy 111354. For the RAID group ID 111351, the identifier allocated to each RAID group is set. For the RAID method 111352, the information showing the RAID method of each RAID group is set (e.g. RAID5, 6). For the configuration device ID 111353, the identifier of the storage drive 171 constituting the RAID group is set.

For the redundancy 111354, the information showing whether each group is currently redundant (YES or NO) is set. Note that the above-mentioned redundant status means the status in which, even if one of the storage drives 171 constituting a RAID group completely stops to operate, the function of the RAID group can be maintained. Meanwhile, the non-redundant status means the status in which, if one of the storage drives 171 constituting the RAID group completely stops to operate, the function of the RAID group cannot be maintained any more. For example, if all the storage drives 171 (including parity drives) constituting a RAID group operated by RAID5 normally operates, "YES" is set for the redundancy 111354, and if the function of the RAID group is maintained even though one of the storage drives 171 constituting the RAID group operated by RAID5 completely stops to operate, "NO" is set for the redundancy 111354.

FIG. 4B shows the main functions and the data included in the expanders 112 and 121. As shown in the figure, the expanders 112 and 121 include a routing processing unit 1221, a broadcast control unit 1222, a discover response processing unit 1223 and a loopback diagnosis execution unit 1224. The expanders 112 and 121 also manage (store) the connection device management table 1225.

The routing processing unit 1221 of each expander 112 or 121 performs data transfer control among Phys 1121 (routing control) according to the setting information of routing and zoning. The function of the routing processing unit 1221 is realized by, for example, the above-mentioned ECR or the ECM.

The broadcast control unit 1222 monitors the presence of the status change of the Phys 1121, such as connection status of the storage drives 171 to be connected with the Phys 1121, the presence of physical links (Linkup/Linkdown), and the presence of communication failure, and if it detects the status change, it transmits a broadcast frame from the Phys 1121. The broadcast control unit 1222 also performs the setting of the broadcast inhibiting flag 111254 of the connection device management table 1225 (described later). The broadcast control unit 1222 is, for example, realized by the above-mentioned BPP or by the processor 1123 reading a program stored in the memory 1124.

The discover response processing unit 1223, when receiving a discover command, transmits the above-mentioned configuration information to the controller 11. The discover response processing unit 1223 is realized by the hardware included in the expanders 112 and 121 or by the processor 1123 of the expanders 112 and 121 reading a program stored in the memory 1124.

The loopback diagnosis execution unit 1224 performs a loopback test in accordance with the loopback diagnosis instruction command transmitted by the controller 11, and transmits the result to the controller 11. Furthermore, as described later, the loopback diagnosis execution unit 1224 blockades the Phys 1121 of the expanders 112 and 121 if it detects a specific type of failures by the loopback test. The loopback diagnosis execution unit 1224 is realized by the hardware included in the expanders 112 and 121 or by the processor of the expanders 112 and 121 reading a program stored in the memory 1124.

FIG. 5C shows an example of the connection device management table 1225. The connection device management table 1225 manages the information related to the Phys 1121 included in the expanders 112 and 121. As shown in the figure, the connection device management table 1225 contains one or more records including a Phy ID 11251, a connection device ID 11252, a Phy status 11253, a broadcast inhibiting flag 11254, and a loopback test result 11255. For the Phy ID 11251, the identifiers of the Phys 1121 included in the expanders 112 and 121 are set. For the connection device ID 11252, the identifiers of the devices connected with the Phys 1121 (e.g. storage drives 171) are set. For the Phy status 11253, the information showing the status of the Phys 1121 (Enable/Disable) is set. For the broadcast inhibiting flag 11254, the information of the indication of the above-mentioned broadcast inhibiting flag is set ("1" (on) for transmission being inhibited or "0" (off) for transmission not being inhibited). For the loopback test result 11255, the result of the loopback test performed by the loopback diagnosis execution unit 1224 is set (Normal/Abnormal).

Description of Processing

Next, the processing performed between the drive controller 111 and the expander 112 or 121 in the controller 11 if a failure related to the storage drives 171 occurs is described. Note that the above-mentioned failure is what triggers the transmission of a broadcast frame, such as a failure in a storage drive 171, a failure in the communication path between the storage drive 171 and the Phys 1121 connected with the relevant storage drive 171, and a failure in the expander 112 or 121 connected with the storage drive 171, FIG. 6 is a flowchart showing the processing performed by the expanders 112 and 121. The above-mentioned processing is described below with reference to the attached figure. Note that the "S" at the beginning of each numeral means a step.

The expanders 112 and 121 monitor for the above-mentioned failure in real-time (S611). If the above-mentioned failure is detected, the expanders 112 and 121 refer to the connection device management table 1225 and determines whether the indication of the broadcast inhibiting flag 11254 of the failed Phy 1121 or the Phy 1121 connected with the failed storage drive 171 indicates transmission being inhibited (S612). If the transmission is being inhibited (S612: YES), the processing is completed (permitted to return to S611). If the transmission is not inhibited (S612: NO), the processing proceeds to S613. At S613, the expanders 112 and 121 transmit a broadcast frame from the Phy 1121. Thus, the expanders 112 and 121 do not issue (transmit) the broadcast if the indication of the broadcast inhibiting flag 11254 shows transmission being inhibited, and therefore, no discover command will be issued (transmitted) by the controller 11 either.

FIGS. 7A and 7B are the flowcharts showing the processing performed by the drive controller 111 of the controller 11 and the expanders 112 and 121 if the drive controller 111 receives the broadcast frame transmitted by the expanders 112 and 121. The processing is described below with reference to the attached figure.

The drive controller 111, when receiving the broadcast frame transmitted by the expanders 112 and 121 (S711: YES), transmits a discover command (S712). The expanders 112 and 121, when receiving the discover command (S713), transmit the above-mentioned configuration information to the drive controller 111 (S714). The drive controller 111 receives the configuration information (S715). As mentioned above, the drive controller 111, when receiving the broadcast frame, transmits the discover command.

Next, the drive controller 111 determines whether the above-mentioned configuration information received includes any link failure of Phys 1121 (a specific type of failures) (S716). If no such information is included (S716: NO), the processing is completed. If any information showing a link failure is included, (S716: YES), the drive controller 111 transmits a loopback diagnosis instruction command to the expanders 112 and 121 which have transmitted the configuration information including the information showing the link failure (hereinafter referred to as the abnormal expanders) (S717).

The expanders 112 and 121, when receiving the loopback diagnosis instruction command (S718), perform a loopback test for the Phy 1121 with the link failure (S719), and reflect the test result on the connection device management table 1225 (S720).

Next, the expanders 112 and 121 judge whether the result of the loopback test includes any failure (S721). If any failure is included in the analysis result (S721: YES), the expanders 112 and 121 blockade the Phy 1121 connected with the storage drive 171 which is connected with the Phy 1121 having the link failure (hereinafter referred to as the failed drive), and updates the connection device management table 1225 (i.e. turns the Phy status 11253 of the relevant Phy 1121 to "blockaded") (S722 and S723). Note that, depending on the type of the failures, not only the Phy 1121 connected with the failed drive but also the other Phys 1121 included in the relevant expanders 112 and 121 or all the Phys 1121 included in the relevant expanders 112 and 121 may be blockaded. Thus, the expanders 112 and 121 blockade the failed drive regardless of the indication of the indication of the broadcast inhibiting flag if a specific type of failures has occurred to the storage drives 171.

At S724, the expanders 112 and 121 transmit the loopback test results to the controller 11. The drive controller 111, when receiving the result (S725), reflects the contents of the result on the device information management table 11134 (S726). The processing proceeds to S751 in FIG. 7B.

At S751 of FIG. 7B, the drive controller 111 refers to the RAID management table 11135, and judges whether the failed drive is the storage drive 171 constituting the RAID group. If the failed drive constitutes the RAID group (S751: YES), the processing proceeds to S752. If not, the processing proceeds to S755.

At S752, the drive controller 111 refers to the RAID management table 11135, and judges whether the RAID group constituted by the failed drive is currently redundant. If it is currently redundant (S752: YES), the processing proceeds to S753. If not (S752: NO), the processing proceeds to S771.

At S753, the drive controller 111 sets the redundancy 111354 of the RAID management table 11135 to "NO." At S754, the drive controller 111 sets the Phy status 111343 of the failed drive in the device information management table 11134 to "Blockaded." Thus, the drive controller 111, if the RAID group to which the failed drive belongs is redundant, blockades the failed drive regardless of the indication of the broadcast inhibiting flag.

At S755, the drive controller 111 transmits the command for blockading the Phy 1121 by which the failed drive is connected with the abnormal expander. The abnormal expander, when receiving the command for blockading the Phy (S756), blockades the Phy 1121 with the link failure (S757), and sets the Phy status 11253 of the Phy 1121 connected with the failed drive of the connection device management table 1225 to "Blockaded." (S758). Thus, the expanders 112 and 121 (abnormal expanders) blockade the failed drive regardless of the indication of the broadcast inhibiting flag if the RAID group to which the failed drive belongs is redundant.

Meanwhile, at S752, if the RAID group is judges not to be redundant (S742: NO), the drive controller 111 sets the indication of the broadcast inhibiting flag 111344 of the Phy 1121 connected with the failed drive of the device information management table 11134 to "1" (ON) i.e. transmission being inhibited (S771). The drive controller 111 further reports (transmits) the turning ON of the broadcast inhibiting flag connected with the failed drive to the abnormal expander (S772).

The abnormal expander, when receiving the above-mentioned report (S773), sets the indication of the broadcast inhibiting flag 11254 of the Phy 1121 connected with the failed drive of the connection device management table 1225 to "1" (ON) i.e. transmission being inhibited (S774).

To summarize, the controller 11 (or its drive controller 111), when receiving a broadcast frame (S711: YES), if the failed drive constitutes the RAID group, judges whether the group is redundant (S752), and if it is redundant, blockades the Phy 1121 connected with the failed drive (S755 to 757). On the other hand, if the group is not currently redundant, the controller 11 turns ON the broadcast inhibiting flag of the Phy 1121 of the failed drive (S771), and does not necessarily blockade the failed drive. Furthermore, the drive controller 111, when receiving the broadcast frame (S711), obtains the configuration information from the expanders 112 and 121 (S715), and if there is any significant failure, transmits a loopback diagnosis instruction command. Then, if the result of the loopback test determines that it is necessary, blockades the Phy 1121 connected with the failed drive regardless of the indication of the broadcast inhibiting flag (S722).

As mentioned above, the storage system 10 of this embodiment, if the RAID group configured by the failed drive is not currently redundant, inhibits the transmission of the broadcast frame, but does not blockade the failed drive. Therefore, if the failure is the type of failures which is able to be recovered such as an intermittent failure, the function of the RAID group will be maintained. Furthermore, if the failure is of a specific type (e.g. significant failure such as a link failure), it blockades the failed drive regardless of the redundancy. Thus, the storage system 10 of this invention enables the appropriate control of operations of the storage system 10 when a failure related to storage drives 171 occurs.

It is noted that a configuration can be considered in which the controller 11 inhibits the transmission of the discover command regardless of a receipt of the broadcast, but in this case, failures which must be certainly detected such as a link failure cannot be detected. The storage system 10 of this embodiment manages the broadcast inhibiting flag per Phy 1121 and inhibits broadcast only if the failure occurs when the RAID group is not redundant, and therefore, if the failure which must be certainly detected occurs, it can take required measures (such as blockage of storage drives 171).

If a failure occurs to a storage drive 171 constituting a RAID group (hereinafter referred to as the first storage drive 171) and its redundancy is lost, and if further a failure occurs to another storage drive 171 constituting the RAID group (hereinafter referred to as the second storage drive 171), the storage system 10 of this embodiment inhibits the blockade of the second storage drive 171. In this case, it is conceivable to maintain the function of the RAID group by making the first storage drive 171 rejoin the RAID group when a failure occurs to the second storage drive 171. In this case, however, setups such as data copy for the purpose of making the first storage drive 171 rejoin the RAID group is required, and the load and the time lag for such setup might affect the service for the external device 2. By inhibiting the blockage of the second storage drive 171 as in this embodiment, the function of the RAID group can be maintained without affecting the service for the external device 2.

Next, the method of releasing the broadcast inhibiting flag (resetting to OFF "0") is described below. FIG. 8 is a flowchart showing the processing performed by the drive controller 111, the expanders 112 and 121 for restoring from the failure by replacing the failed storage drive 171.

The drive controller 111, when detecting the attachment of a new storage drive 171 to the basic chassis 101 or the additional chassis 102 (S811: YES), sets the Phy status 111343 of the Phy 1121 of the expanders 112 and 121 to which the relevant storage drive 171 of the device information management table 11134 is attached to "Available" (S812), and transmits a command for starting the spin-up of the relevant storage drive 171 to the expanders 112 and 121 (S813).

The expanders 112 and 121, when receiving the spin-up start command from the drive controller 111, set the Phy status 11253 of the Phy 1121 to which the storage drive 171 of the connection device management table 1225 is attached to "Available" (S814), and starts the spin-up of the attached storage drive 171 (S815).

Next, the drive controller 111 refers to the RAID management table 11135 and judges whether the attached storage drive 171 constitutes the RAID group (S816), and if it does not (S816: NO), the processing is completed. On the other hand, if it constitutes the RAID group (S816: YES), the drive controller 111 performs the setup processing for making the attached storage drive 171 join the RAID group (such as copying the data stored in the other components of the RAID group) (S817).

Next, the drive controller 111 determines whether the relevant RAID group is redundant (S818), and if it is (S818: YES), the processing is completed. On the other hand, if the relevant RAID group is not redundant (S818: NO), the drive controller 111 sets the indication of the broadcast inhibiting flag 111344 being set for the storage drive 171 constituting the relevant RAID group in the device information management table 11134 to "0" (OFF) (S819). The drive controller 111 also transmits a command for performing the same processing to the expanders 112 and 121 (i.e. setting the indication of the broadcast inhibiting flag to "0" (OFF)) (S819).

The expanders 112 and 121, when receiving the above-mentioned command, set the indication of the broadcast inhibiting flag 11254 being set for the storage drive 171 belonging to the relevant RAID group of the connection device management table 1225 to "0" (OFF) (S820). The expanders 112 and 121 make the attached and set up storage drive 171 join the RAID group, and further set the Phy status 11253 of the blockaded Phy 1121 of the connection device management table 1225 for blockading the Phy 1121 connected with the failed drive to "Blockaded." (S821). Thus, the indication of the broadcast inhibiting flag is reset to OFF "0" if the failure is restored and the redundancy of the RAID group is recovered.

It is to be understood that the above-mentioned embodiments are intended for ease of understanding this invention and not limited to particular constructions. This invention may include any changes, modifications or equivalents within the spirit and scope hereof.

The invention claimed is:

1. A storage system comprising:
   a plurality of storage drives,
   a switch device connecting the storage drives,
   an I/O processing unit which accesses the storage drives via the switch device in accordance with a data input/output request received from an external device,
   a storage drive control unit which configures a group of the storage drives and operates the group by redundancy method, a broadcast transmitter which, when detecting a failure related to the storage drives, transmits broadcast to a communication path connecting the I/O processing unit and the storage drives, and a failure monitoring unit which, when receiving the broadcast, transmits a discover command to the switch device; wherein the storage system manages current redundancy of the group, manages a broadcast inhibiting flag by which information is set per storage drive whether to inhibit broadcast transmission, sets the broadcast inhibiting flag to inhibiting broadcast transmission when a failure occurs to the storage drive which constitutes the group being operated without redundancy, and when a failure related to the storage drive occurs, judges whether the broadcast inhibiting flag of the relevant storage drive is set to inhibiting broadcast transmission, and if it is set to inhibiting, inhibits transmission of the broadcast.

2. The storage system according to claim 1, wherein when a failure related to the storage drive occurs, a loopback diagnosis is performed on the failed storage drive, and if the failure is of a specific type, the failed storage drive is blockaded regardless of the indication of the broadcast inhibiting flag.

3. The storage system according to claim 1, wherein, when a failure related to the storage drive occurs, if the group constituted by the relevant storage drive is redundant, the failed storage drive is blockaded.

4. The storage system according to claim 1, wherein when the failure of the storage drive is solved and the redundancy of the group is restored, the broadcast inhibiting flag of the storage drive constituting the group is set to not inhibiting broadcast transmission.

5. The storage system according to claim 2, wherein the storage system blockades the storage drive by blockading a communication port which is connected with the failed storage drive among the communication ports included in the switch device.

6. The storage system according to claim 3, wherein the storage system blockades the storage drive by blockading a communication port which is connected with the failed storage drive among the communication ports included in the switch device.

7. The storage system according to claim 1, wherein the switch device is an expander.

8. The storage system according to claim 1, wherein the storage drives are hard disk drives or semiconductor storage devices (SSDs), and the group is a RAID group configured where the storage drives are operated by a RAID method with redundancy.

9. A method for controlling a storage system comprising a plurality of storage drives, a switch device connecting the storage drives, an I/O processing unit which accesses the storage devices via the switch device in accordance with a data input/output request received from an external device, a storage drive control unit which configures a group of the storage drives and operates the group by redundancy method, a broadcast transmitter which, when detecting a failure related to the storage drives, transmits broadcast to a communication path connecting the I/O processing unit and the storage drives, and a failure monitoring unit which, when receiving the broadcast, transmits a discover command to the switch device; wherein the storage system manages current redundancy of the group, manages a broadcast inhibiting flag by which information is set per storage drive whether to inhibit broadcast transmission, sets the broadcast inhibiting flag to inhibiting broadcast transmission when a failure occurs to the storage drive which constitutes the group being operated without redundancy, and when a failure related to the storage drive occurs, judges whether the broadcast inhibiting flag of the relevant storage drive is set to inhibiting broadcast transmission, and if it is set to inhibiting, inhibits transmission of the broadcast.

10. The method for controlling the storage system according to claim 9, wherein when a failure related to the storage drive occurs, a loopback diagnosis is performed on the failed storage drive, and if the failure is of a specific type, the failed storage drive is blockaded regardless of the indication of the broadcast inhibiting flag.

11. The method for controlling the storage system according to claim 9, wherein when a failure related to the storage drive occurs, if the group constituted by the relevant storage drive is redundant, the failed storage drive is blockaded.

12. The method for controlling the storage system according to claim 9, wherein when the failure of the storage drive is solved and the redundancy of the group is restored, the broadcast inhibiting flag of the storage drive constituting the group is set to not inhibiting broadcast transmission.

* * * * *